United States Patent [19]

Bruce, Jr. et al.

[11] 4,328,629
[45] May 11, 1982

[54] SHELLFISH DREDGE CHAFING GEAR

[75] Inventors: Walter J. Bruce, Jr., New Bedford; Wayne M. Bruce, Dartmouth, both of Mass.

[73] Assignee: Bruce's Splicing & Rigging Co., Inc., New Bedford, Mass.

[21] Appl. No.: 201,496

[22] Filed: Oct. 28, 1980

[51] Int. Cl.³ .................... A01K 73/00; E02F 5/00
[52] U.S. Cl. .................................. 37/55; 43/4.5; 43/9; 172/392
[58] Field of Search ............... 43/4.5, 7, 9, 100, 104; 37/55, 122, 119; 56/8; 172/392, 747, 764; 404/118; 15/53 R, 53 A

[56] References Cited

U.S. PATENT DOCUMENTS

| | | |
|---|---|---|
| 97,420 | 11/1869 | Mayhew. |
| 1,104,154 | 7/1914 | Stinson .......................... 37/119 |
| 1,480,192 | 1/1924 | Worsfold. |
| 2,658,216 | 11/1953 | Shusett et al. ................ 15/53 R |
| 2,684,549 | 7/1954 | Olden .............................. 43/9 |
| 2,686,380 | 8/1954 | Seppala ........................... 43/9 |
| 3,120,714 | 2/1964 | Goodwin ........................ 43/9 |
| 3,367,048 | 2/1968 | Doughty ....................... 37/55 |
| 3,561,150 | 2/1971 | Silchenstedt ................. 43/4.5 |
| 3,608,217 | 9/1971 | Voisin ........................... 43/9X |
| 3,973,575 | 8/1976 | Sullivan et al. .............. 37/55 X |
| 4,112,602 | 9/1978 | Kato. |

FOREIGN PATENT DOCUMENTS 696165 10/1964 Canada .................................. 43/9

OTHER PUBLICATIONS

*National Fisherman,* Sep. 1980, vol. 61, No. 5 (Advertisement).

*Primary Examiner*—Stephen G. Kunin
*Assistant Examiner*—Robert P. Olszewski

[57] ABSTRACT

A device for protecting shellfish dredge chain bags, featuring arcuate strips of reinforced rubber attached to the bottom side of the bag to cushion and separate the bag from abrasive action against the ocean floor when it becomes weighted with rocks and shellfish. These arcuate strips are cut from used vehicle tires and are attached to the chain bag in a manner that protects the forward edge and corners of the strip and the attaching device from catching on the ocean floor while allowing the longer portion of the reinforced rubber strip to trail beneath the chain bag.

7 Claims, 12 Drawing Figures

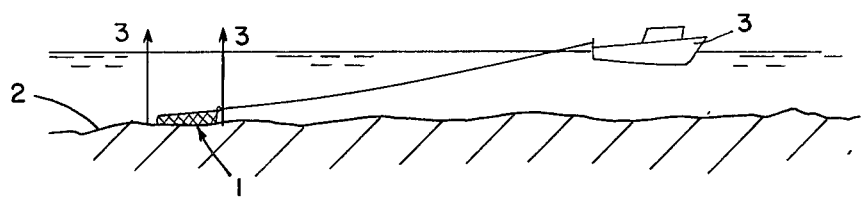
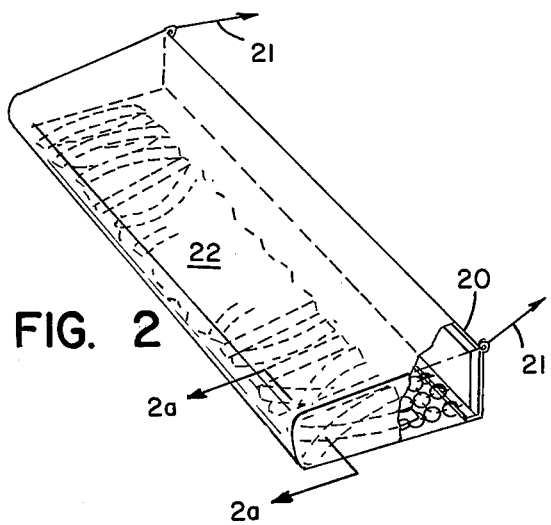
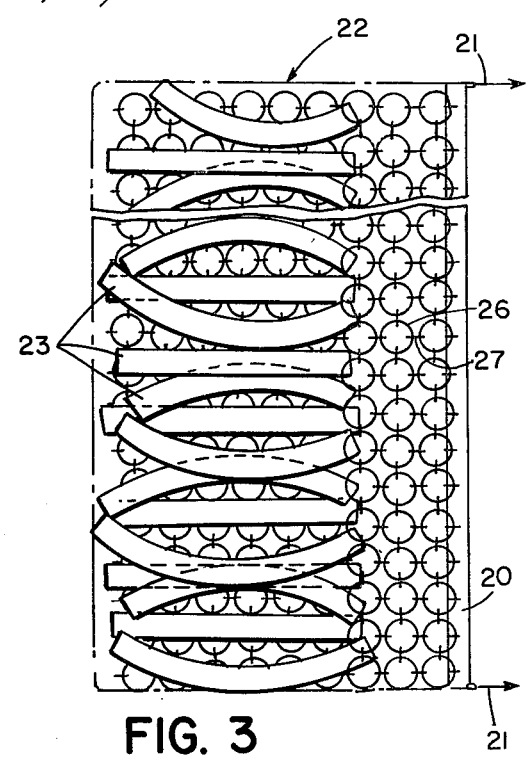
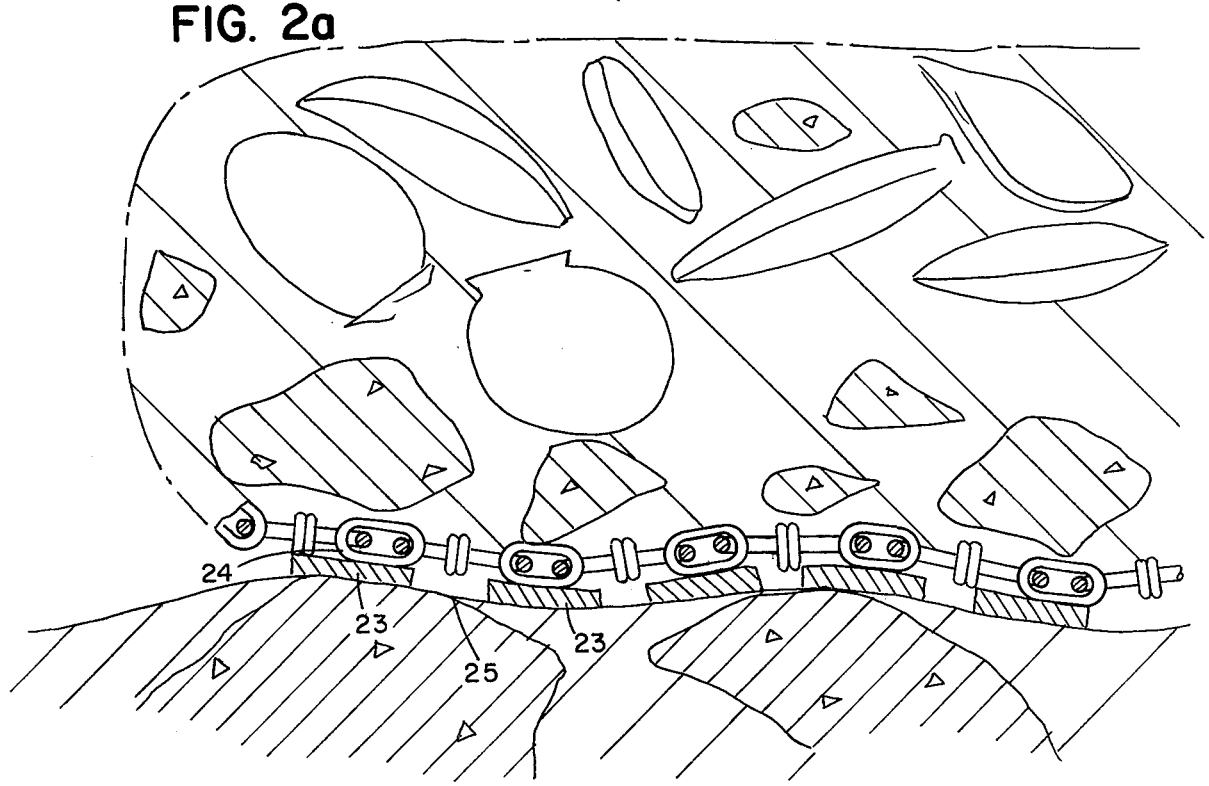

SHELLFISH DREDGE CHAFING GEAR

FIELD OF THE INVENTION

This invention relates to shellfish dredge chain bags.

BACKGROUND OF THE INVENTION

Shellfish of certain types, i.e., scallops or oysters, are harvested by use of a shellfish dredge. This dredge is comprised of a rectangular metal frame enclosed on one side by a bag constructed of linked steel rings. The dredge device is towed along the ocean floor, the lower section of steel frame constructed to "rake" into the attached chain bag shellfish located in its path. It is the nature of the device that numerous rocks and other objects are also collected. The added weight in the chain bag causes it to chafe, or wear, against the ocean bottom. It has been attempted to use sections from other damaged bags attached beneath the chain bag to extend the useful life of the bag but this has added unnecessary weight, making equipment more difficult to handle.

It is the objective of this invention to provide a means to give better protection to shellfish chain bags with an apparatus that is cheap and easy to handle.

SUMMARY OF THE INVENTION

According to the invention it has been found that effective elongated chafing gear strips can be cut from used vehicle tires and attached to trail beneath the chain bag in a manner to protect the underside of the chain bag. The elongated strips separate the full weighty chain bag from wear-producing pressure contact with the hard and rough surface of the ocean floor and thereby reduce wear of the bag.

The invention especially features the circumferential cutting and separation of the side wall portion of a used vehicle tire from its tread portion and cutting from the resulting annular segments, strips of generally elongated form that retain a curvature that generally corresponds to the shape of the original tire segment. Such a strip is then adapted to be attached at one end to a forward part of the chain bag, the curved strip adapted to trail from the point of attachment, in wear-protecting relationship to the underside of the chain bag. By use of the curved form, a large part of the used tire can be usefully employed in manufacture of the chafing gear strips; the curved nature of the strip is found not to detract from its effectiveness and, in fact, increases the strength of the strip by conforming to the configuration of the reinforcing fabric within the tire segment. The curved nature of strips made from sidewalls also causes those strips to lie, in part, transverse to the direction of travel of the dredge, thereby creating a more effective skid against the ocean floor.

In preferred embodiments, the strips are attached by means of chain links at one end of the strip, the strip being attached from above the bottom portion of the bag at a point near the steel frame and the unattached end of the strip passing between links in the bag posterior to the attaching location to trail beneath the chain bag. In an alternate embodiment, the attaching may be achieved by splitting the strip from its rear end to a hole close to the forward end, and, from above the bottom portion of the chain bag at a point close to the steel frame, passing the split ends on either side of a link in the chain bag to engage the hole about the link while the split ends of the strip trail beneath the chain bag. In both embodiments, the leading end of the strip and the attaching means are located within the chain bag, thereby protected from catching on the ocean floor.

PREFERRED EMBODIMENT

The structure and operation of a preferred embodiment of the invention will now be described, after first briefly describing the drawings.

Drawings

FIG. 1 is a perspective view of a shellfish dredging operation;

FIG. 2 is a perspective view of a shellfish dredge employing the preferred embodiment;

FIG. 2a is a section view at 2a—2a of FIG. 2 showing operation of the preferred embodiment;

FIG. 3 is a partial bottom view of a shellfish dredge employing the preferred embodiment;

Structure

Figure 4:
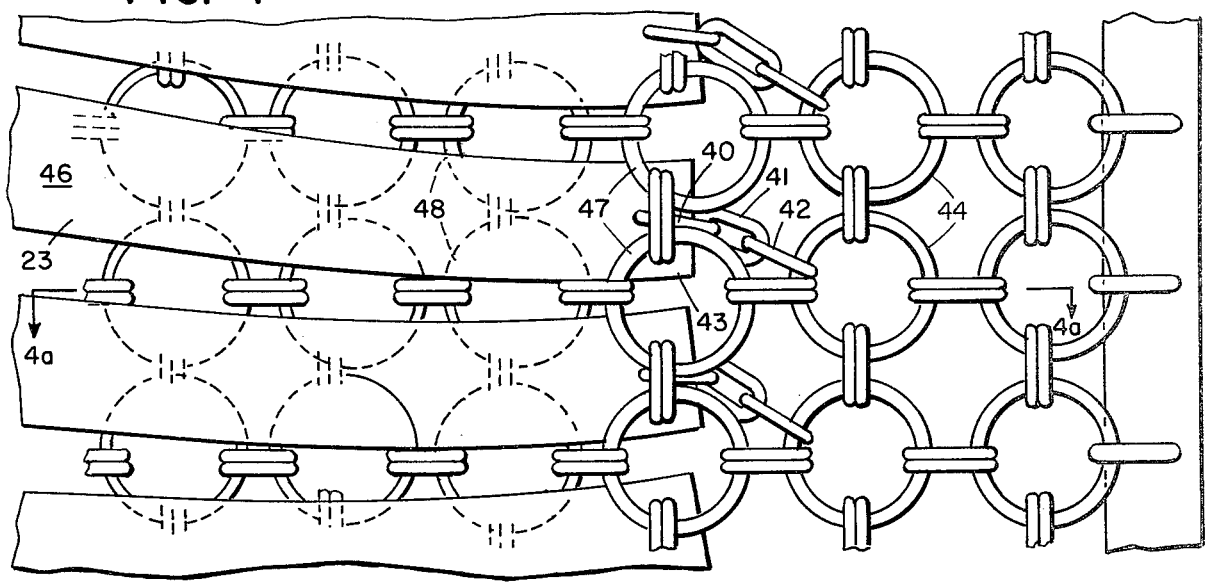
FIG. 4 is a plan view of the preferred embodiment of the method of attachment looking up at the bottom of the bag.
Figure 4A:
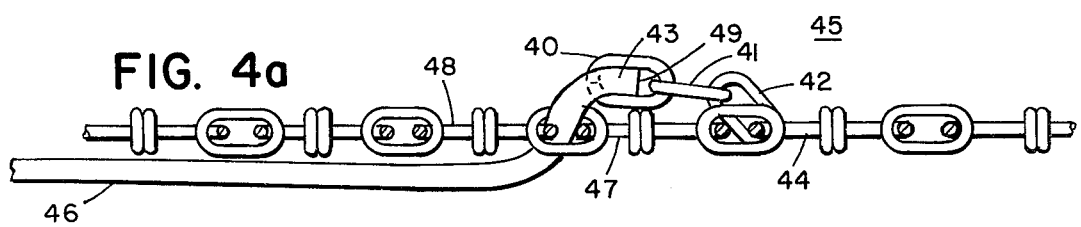
FIG. 4a is a section view at 4a—4a of FIG. 4.
Figure 5:
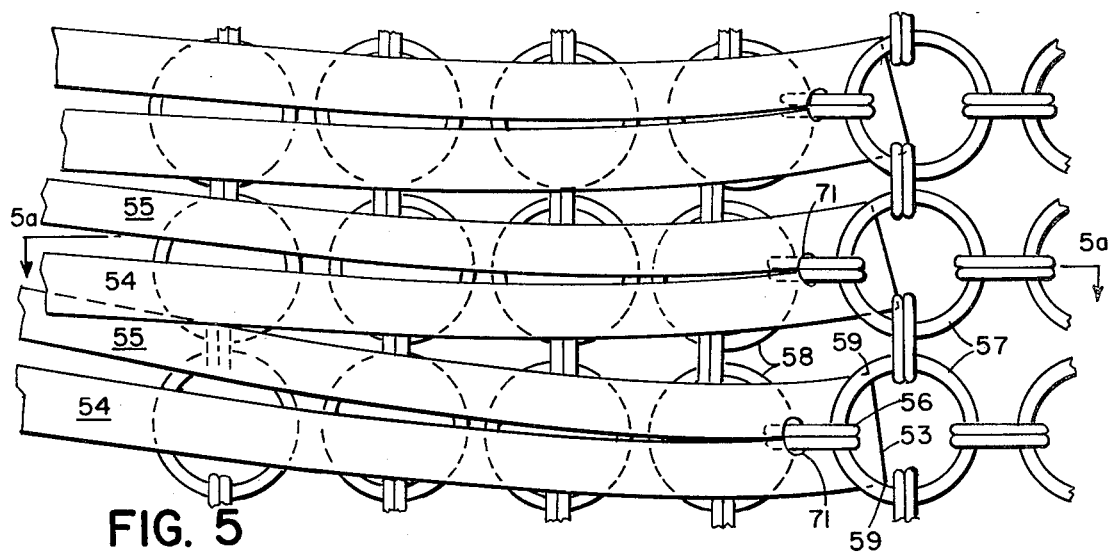
FIG. 5 is a plan view of an alternate embodiment of the method of attachment looking up at the bottom of the bag.
Figure 5A:
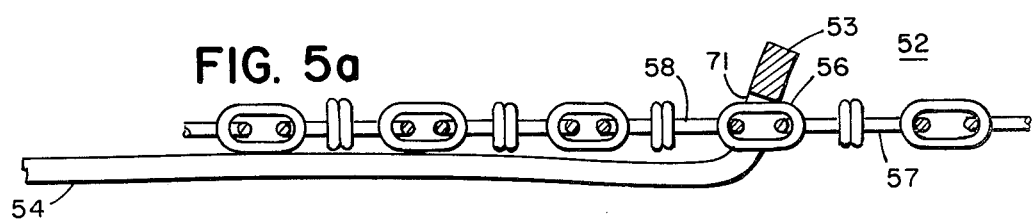
FIG. 5a is a section view at 5a—5a of FIG. 5.

In FIG. 1, the shellfish dredge 1 is towed along the ocean floor 2 behind a boat 3. The shellfish dredge, FIGS. 2 and 3, is comprised of a rectangular frame 20 which is attached by means of cable 21 to the tow boat. Attached to the frame and trailing behind is a chain bag 22 composed of steel rings 26, connected by links 27 to the rings on four sides. In commercial applications, each ring has an inner diameter of 3 inches and one side of a chain bag is 10 rings long and from 28 to 54 rings wide.

Attached beneath the chain bag are arcuate strips of rubber 23 cut from vehicle tires, the strips acting as a cushion between the chain bag lower side 24 and the ocean floor 25.

The strips may be attached to the chain bag by chain links as at FIG. 4. The links 40 through 42 connect one end of the strip 43 to the chain bag at the second row of rings 44 behind the rectangular frame from above 45 the bottom side of the chain bag. The unattached end of the rubber strip 46 is threaded between the third row 47 and fourth row 48 of chain bag links to cause the longer portion of the strip 46 to trail beneath the chain bag, while the corners and the leading edge of the strip 49 and the attaching means are within the chain bag thereby protected from abrasion on the ocean floor.

Operation

Figure 6:
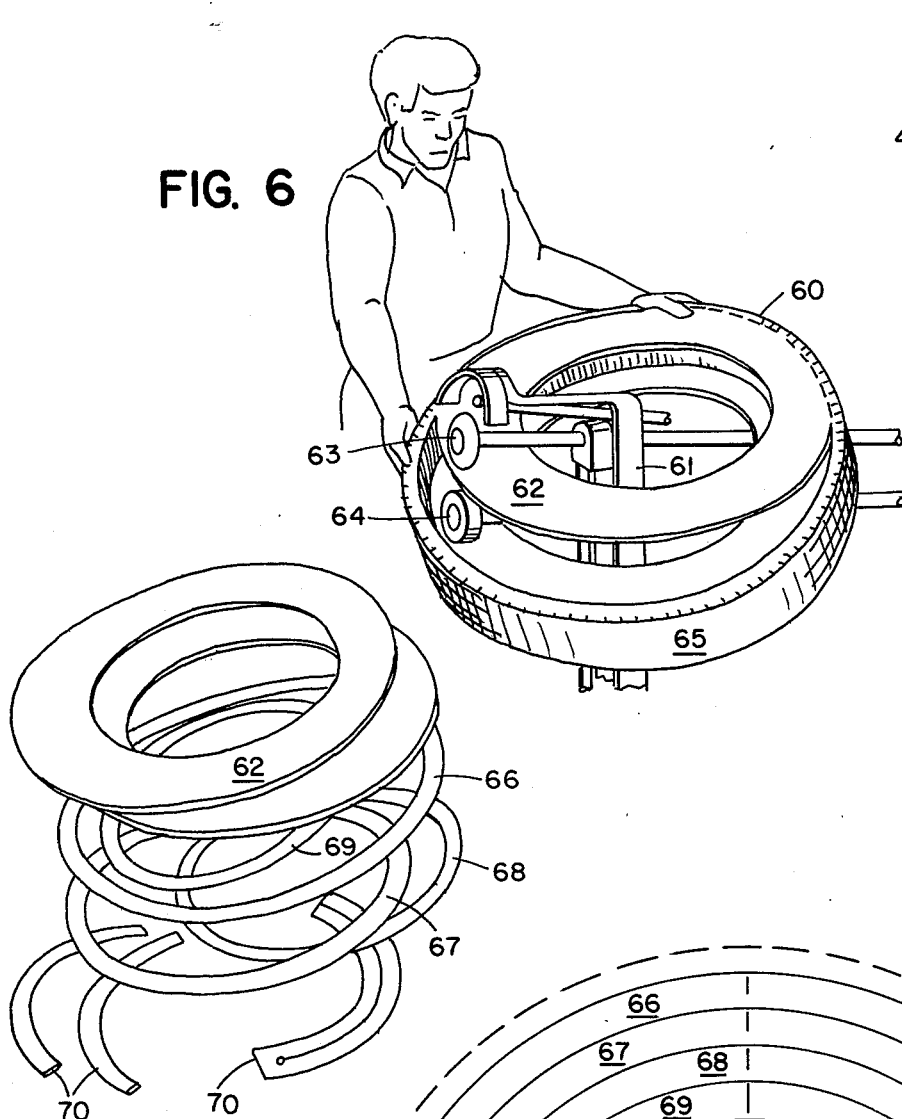
FIG. 6 is a perspective view of the preferred method of reducing the vehicle tire to arcuate strips.
Figure 8:
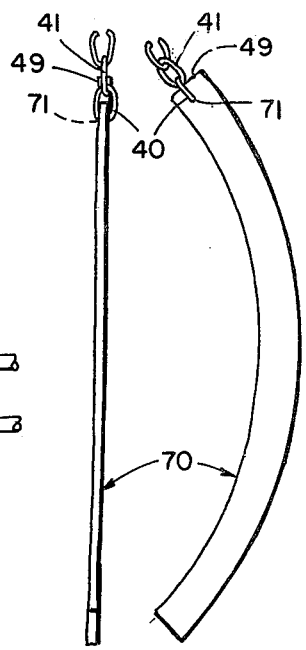
FIG. 8 is a face and side plan view of a strip according to the preferred embodiment.
Figure 9:
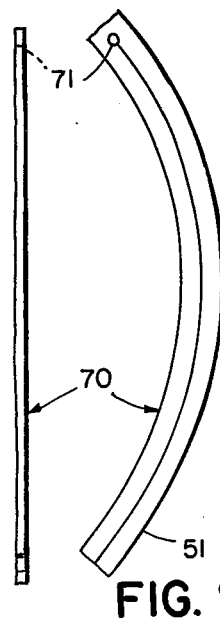
FIG. 9 is a face and side plan view of a strip according to an alternate embodiment.
Figure 7:
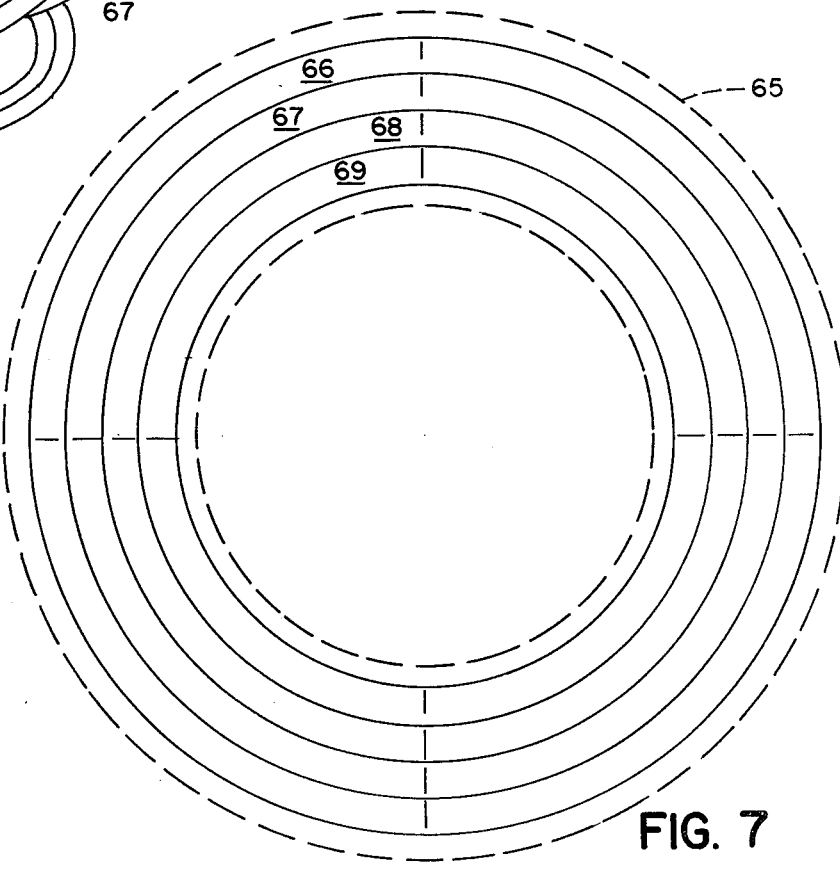
FIG. 7 is a plan view of a vehicle tire side wall marked for cutting to arcuate strips.

In FIG. 6, a used vehicle tire 60 is placed on a cutting apparatus 61 whereby the tire side wall 62 is impinged between a rotating cutting wheel 63 and a rotating drive wheel 64. Each side wall is cut from the tire at a position close to the tread section 65. Thereafter each sidewall is cut into four concentric rings, 66 through 69 and each ring is cut into 3 or more arcuate strips 70, each strip being approximately 2 to 3 inches wide and 24 to 30 inches long. A hole 71 is cut in the forward end of each strip for the means of attachment.

The tread segment 65 cut from the used vehicle tire is also used for this invention. That part of the tread segment which is of a thickness generally equal to that of the vehicle tire sidewall segments is cut into one or more annular rings. The portion usable for this invention varies relative to tire design and amount of wear, usually including the tread center section and less frequently including the edge sections, which are generally too thick for attachment by the described means. Each annular ring is cut into a number of end-to-end arcuate strips that are curved in the circumferential direction of the tire tread segment.

The strips are prepared for attaching by inserting a chain link 40 through the hole 71 at the forward end 49 of the strip. A second link 41 is closed through the first link.

The strip is attached to the chain bag from above the bottom side of the bag by closing a chain link 42 around the link secured to the strip and the second row of chain bag rings. The unattached end of the strip 46 is passed between the third row 47 and the fourth row 48 of rings. When the dredge is towed along the ocean floor, the free end of the strip trails beneath the chain bag to cushion and separate the chain bag from the ocean floor, while the attaching means and the lead end of the strip are within the chain bag.

OTHER EMBODIMENTS

Other embodiments of the invention are within the claims. For example, the rubber strip 70 is split from rear end 51 to the hole 71 cut near the forward end 53. The split ends 54 and 55 are passed from above the bottom side of the bag 52 on either side of a chain link 56 connecting the second row 57 and third row 58 of chain rings in the chain bag. The hole 71 in the strip engages about the chain link 56, and the split ends trail beneath the chain bag, while the corners 59 and the leading edge 53 of the strip remain protected within the chain bag.

What is claimed is:

1. A method for providing means for protecting shellfish dredge chain bags from wear caused by dragging on the ocean floor,
    said method comprising:
    cutting a used vehicle tire into at least one annular ring,
    thereafter cutting said ring into a plurality of arcuate strips having a curvature that generally corresponds to the curvature of the original tire section,
    and providing at one end of each said arcuate strip means for attachment of said end to the lower side of a shellfish dredge chain bag.

2. The method of claim 1,
    said annular ring being a flat, annular ring cut from the side walls of a used vehicle tire wherein said flat, annular ring is cut into a plurality of concentric, flat, annular rings,
    each said concentric, flat, annular ring being cut into a series of end-to-end arcuate strips.

3. The method of claim 1 or 2, wherein said means for attachment comprises at least one attachment link secured through a hole in one end of said strip.

4. The method of claim 3 including the step of attaching said strip to a chain bag by:
    securing, from above the bottom side of the chain bag, said link about a link in the chain bag and passing the unsecured end of said rubber strip between the rings of the chain bag at a point posterior to the securing link,
    said method locating the securing means and resistive leading edge of the strip within the chain bag away from destructive contact with the ocean floor,
    and locating the larger portion of the arcuate strip in protective position between the chain bag and the ocean floor.

5. Chafing gear for protecting the bottom portion of a shellfish dredge chain bag from the wear caused by dragging on the ocean floor,
    said chafing gear comprising:
    an elongated strip of reinforced rubber in a form of a segment of a used vehicle tire,
    said strip having means at a forward end for attachment to the bottom of the chain bag in the manner that said strip trails from said point of attachment in protective relationship to the underside of said chain bag.

6. The device of claim 5, wherein said reinforced rubber strips are the arcuate sections of vehicle tires cut from the sidewalls.

7. The device of claim 5, wherein the means of attachment comprises:
    a hole cut in the forward end of the rubber strip,
    a link inserted through said hole and closed, and
    a second link closed through said first link.

* * * * *

Disclaimer

4,328,629.—*Walter J. Bruce Jr.*, New Bedford, and *Wayne M. Bruce*, Dartmouth, Mass. SHELLFISH DREDGE CHAFING GEAR. Patent dated May 11, 1982. Disclaimer filed Aug. 14, 1984, by the assignee, *Bruce's Splicing & Rigging Co., Inc.*

Hereby enters this disclimer to claims 1, 3, 5, and 6 of said patent.
[*Official Gazette Sept. 25, 1984.*]